(12) United States Patent
Kay

(10) Patent No.: US 10,254,105 B2
(45) Date of Patent: Apr. 9, 2019

(54) EXCHANGEABLE LENS MODULE SYSTEM FOR PROBES OF OPTICAL MEASURING MACHINES

(71) Applicant: Quality Vision International, Inc., Rochester, NY (US)

(72) Inventor: David B. Kay, Rochester, NY (US)

(73) Assignee: Quality Vision International, Inc., Rochester, NY (US)

( * ) Notice: Subject to any disclaimer, the term of this patent is extended or adjusted under 35 U.S.C. 154(b) by 73 days.

(21) Appl. No.: 15/369,355

(22) Filed: Dec. 5, 2016

(65) Prior Publication Data

US 2018/0156595 A1 Jun. 7, 2018

(51) Int. Cl.
*G01B 9/02* (2006.01)
*G02B 7/14* (2006.01)
*G01B 11/24* (2006.01)

(52) U.S. Cl.
CPC ....... *G01B 9/0205* (2013.01); *G01B 9/02035* (2013.01); *G01B 11/2441* (2013.01); *G02B 7/14* (2013.01)

(58) Field of Classification Search
CPC .............. G01B 9/0205; G01B 11/2441; G01B 9/02045; G02B 21/006; G02B 21/0025; G02B 21/248; G02B 7/02
See application file for complete search history.

(56) References Cited

U.S. PATENT DOCUMENTS

| 5,065,526 | A | 11/1991 | Breyer |
| 5,185,936 | A | 2/1993 | McMurtry |
| 5,505,005 | A | 4/1996 | McCurtry et al. |
| 5,705,814 | A | 1/1998 | Young et al. |
| 5,825,666 | A | 10/1998 | Freifeld |
| 5,907,400 | A | 5/1999 | Aziz |
| 6,985,232 | B2 | 1/2006 | Seziner |
| 7,055,258 | B2 | 6/2006 | Hajdukiewicz et al. |
| 8,817,240 | B2 | 8/2014 | Jones et al. |
| 8,910,311 | B2 | 12/2014 | Humphris et al. |

(Continued)

FOREIGN PATENT DOCUMENTS

| EP | 0368040 B1 | 2/1993 |
| EP | 0293036 B1 | 4/1994 |

OTHER PUBLICATIONS

FCR25 Flexible change racks for automated changing of SP25 scanning and touch-trigger modules; 2001-2016 Renishaw plc.; http://www.renishaw.com/en/fcr25--7406, downloaded Jul. 25, 2016.

(Continued)

*Primary Examiner* — Michael P LaPage
(74) *Attorney, Agent, or Firm* — Thomas B. Ryan, Patent Agent; Harter Secrest & Emery LLP

(57) ABSTRACT

An interferometric measuring machine includes an exchangeable lens module system for an optical probe. The probe includes a lens body containing the optical apparatus of an interferometer and a lens module containing an objective lens along an object arm of the interferometer that can be exchanged with other lens modules for varying the measuring characteristics of the probe. The lens modules are adapted to accommodate objective lenses having different focal lengths while maintaining a desired optical path length of the object arm of the interferometer.

9 Claims, 8 Drawing Sheets

(56) References Cited

U.S. PATENT DOCUMENTS

| | | | |
|---|---|---|---|
| 8,959,980 B2 | 2/2015 | Vodnick | |
| 2006/0103921 A1* | 5/2006 | Karaki | G02B 7/14 359/368 |
| 2008/0130103 A1* | 6/2008 | Hara | A61B 5/0059 359/369 |
| 2013/0314690 A1* | 11/2013 | Jones | G01B 21/047 356/4.01 |
| 2014/0015953 A1 | 1/2014 | Turgeman et al. | |
| 2015/0055137 A1* | 2/2015 | Brown | G01B 9/02091 356/479 |
| 2016/0216501 A1 | 7/2016 | Cable et al. | |

OTHER PUBLICATIONS

U.S. Appl. No. 15/133,837, filed Apr. 20, 2016 sharing the same Applicant and Inventor with the subject application.

International Search Report and Written Opinion of the International Searching Authority (PCT/US2017/059900) dated Jan. 29, 2018.

* cited by examiner

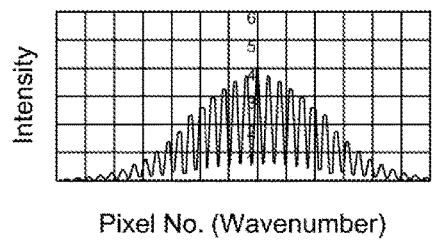
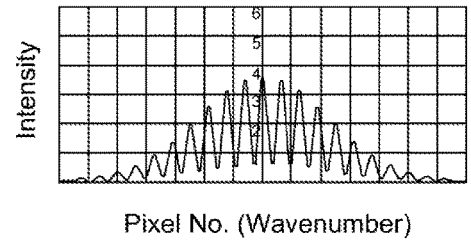
FIG. 3A  FIG. 3B
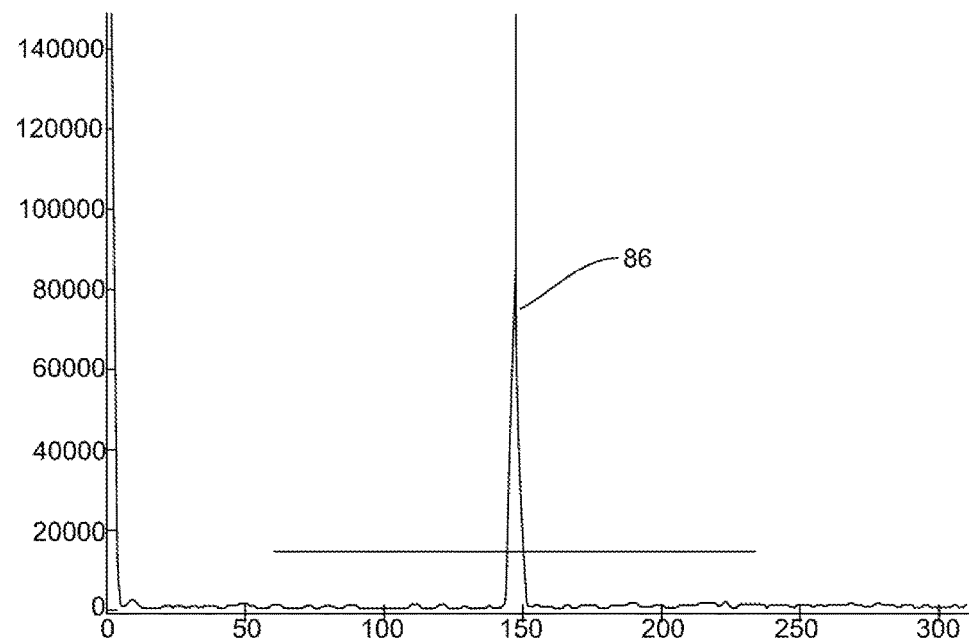
FIG. 4

EXCHANGEABLE LENS MODULE SYSTEM FOR PROBES OF OPTICAL MEASURING MACHINES

TECHNICAL FIELD

The invention relates to measuring machines with optical probes for measuring test objects using interferometric techniques and to systems for exchanging the optical ends of the probes from among an interchangeable set of such optical ends for adapting the measuring machine to the measurement of different test objects or test object features.

BACKGROUND

Coordinate measuring machines are typically arranged for capturing point-by-point measurements along the surfaces of test objects using probes whose displacement with respect to the surfaces is measured within a common coordinate system. The measures typically include measurements of the relative motions of the probes with respect to the test objects along or about motion axes of the machines as well as measurements of the relative displacements of the probes with respect to the surfaces of the test objects.

The probes can take various forms including physical probes that contact the surfaces of test objects and optical probes, sometimes referred to as optical pens, that reflect focused light from the surfaces of the test objects. The reflected light can be analyzed as a measure of distance.

For example, U.S. Pat. No. 8,817,240 of Jones et al. describes an optical probe that exploits chromatic dispersion through confocal optics for focusing different wavelengths at different focal lengths and measuring distance as a function of the wavelength that is reflected through the confocal aperture. For varying the range or direction of measurement, the '240 patent divides the optical pen into a base member that includes the confocal aperture and an interchangeable element that includes chromatically dispersive optics. A repeatable fast exchange mount allows the interchangeable element to be replaced by another interchangeable element having different chromatically dispersive optics or other features for varying the range or direction of measurement.

Another type of optical probe for taking distance measurements with a partially coherent interferometer is described in U.S. Pat. No. 7,791,731 of Kay, who is also the named inventor of the subject application. A spatially coherent source beam composed of multiple wavelengths, i.e., a low temporally coherent beam, is divided by a beamsplitter into an object beam that is reflected from the test object and a reference beam that is reflected from a reference reflector. Reflected light from both the test object and the reference reflector is recombined at a beamsplitter into a measurement beam and refocused within a detector such as a spectrometer, which records interference intensities of the different spectral components of the returning measurement beam. The rate of change in interference intensities over the captured spectrum is equated to a measure of distance. Exchanging probe parts containing entire interferometers is particularly problematic because of issues of bulk and cost, and exchanging parts of interferometers is particularly problematic because any differences can change the measurement results.

SUMMARY OF INVENTION

Among the embodiments contemplated for this invention, an optical probe in the form of a partially coherent interferometer for a coordinate measuring machine includes an exchangeable lens module system that allows different lens modules to be exchanged for such purposes as adjusting the working distance or accuracy of the optical probe. The lens modules can be docked in a magazine (or change rack) within the range of travel of the measuring machine axes for automatically exchanging the lens modules.

One version of the invention presents an exchangeable lens module system for an optical probe of an interferometric measuring machine arranged for measuring surface height variations of test objects within a given tolerance. The system includes a plurality of lens modules, each including a number of interrelated features. For example, each such lens module includes (a) a lens module housing having proximal and distal ends, (b) an objective lens mounted within the lens module housing for focusing a collimated object beam to a focal point located beyond the distal end of the lens module housing, (c) a kinematic coupling member at the proximal end of the lens module housing for connecting the lens module housing to a mating kinematic coupling member of the interferometric measuring machine, and (d) an optical path length between each of the focal points and the respective kinematic coupling members at the proximal ends of each of the lens module housings;

Two or more of the lens modules are distinguished by their objective lenses having focal lengths that differ by more than the given tolerance for measurement (e.g., plus or minus 2 microns) but are expected to typically differ by much more (e.g., 20 millimeters). In addition, each of the objective lenses of the two or more of the lens modules are spaced apart from their respective kinematic couplings at the proximal ends of their respective lens module housings through a distance that equalizes the optical path lengths between each of the focal points and the respective kinematic coupling members of the two or more lens modules to within the given tolerance.

The optical probe of the interferometric measuring machine preferably includes a probe body supporting the mating kinematic coupling member, a single mode fiber optically coupled within the probe body, and a collimator mounted within the probe body for collimating a source beam emitted from the single mode fiber. In addition, the probe body preferably includes the interferometric elements of a reference reflector and a beamsplitter. The beamsplitter is arranged for dividing the collimated source beam into both (a) the object beam that is directed along an object arm through the mating kinematic coupling member for propagation through the lens module housing to the focal point on a test object and (b) a reference beam that is directed along a reference arm to the reference reflector. The beamsplitter is also arranged for combining the object beam reflected from the test object with the reference beam reflected from the reference reflector into the measurement beam. The collimator provides for focusing the measurement beam into the single mode fiber for propagation toward a detector of the interferometric measuring machine.

The measuring machine preferably includes a docking station for holding one or more of the lens modules. The probe body is preferably relatively movable with respect to the docking station for (a) aligning the mating kinematic coupling member of the probe body with the kinematic coupling member at the proximal end of the lens module housing of the one lens module, (b) engaging the kinematic coupling member at the proximal end of the lens module housing of the one lens module with the mating kinematic coupling member of the probe body, and (c) withdrawing the one lens module from the docking station. The docking station preferably includes a plurality of lens module holders and the probe body is preferably further relatively movable with respect to the docking station for (d) aligning the one lens module with one of the lens module holders, (e) disengaging the kinematic coupling member at the proximal end of the lens module housing of the one lens module with the mating kinematic coupling member of the probe body, and (f) withdrawing the probe body leaving behind the one lens module in the one lens module holder.

Another version of the invention presents a method of exchanging lens modules of an optical probe in an interferometric measuring machine arranged for measuring surface height variations of test objects within a given tolerance. The method includes coupling a probe body of the interferometric measuring machine to a first of the lens modules. Each of the lens modules includes lens module housing with a kinematic coupling member at a proximal end of the lens module housing and an objective lens for forming a focal point beyond a distal end of the lens module housing. The probe body includes the mating kinematic coupling member. A first optical path length is defined between the mating kinematic coupling member of the probe body and the focal point beyond a distal end of the lens module housing of the first lens module.

A second of the lens modules is held in one of a plurality of lens module holders of a docking station. The respective objective lenses of the first and second lens modules have different focal lengths that differ by more than the given tolerance. Succeeding steps include decoupling the mating kinematic coupling member of the probe body from the kinematic coupling member of the first lens module, leaving the first lens module in another of the lens module holders of the docking station, coupling the mating kinematic coupling member of the probe body to the kinematic coupling member of the second lens module, and removing the second lens module from the one lens module holder of the docking station. A second optical path length is defined between the mating kinematic coupling member of the probe body and the focal point beyond a distal end of the lens module housing of the second lens module. The second optical path length is maintained approximately equal to the first optical path length within the given tolerance between the successive steps of coupling the probe body with the first and second lens modules.

Preferably, a source beam emitted from a single mode fiber is collimated and a beamsplitter divides the collimated source beam into both an object beam that is directed along an object arm through the mating kinematic coupling member and a reference beam that is directed along a reference arm to a reference reflector. A reference optical path length is defined along an optical path from the beamsplitter to the reference reflector, a first object optical path length is defined along an optical path from the beamsplitter to the focal point of the first lens module, and the first object optical path length differs from the reference optical path length by a predetermined amount. A second object optical path length is defined along an optical path from the beamsplitter to the focal point of the second lens module, and the second object optical path length differs from the reference optical path length by an amount corresponding to the predetermined amount to within the given tolerance. In a preferred implementation, the given tolerance encompasses a range of variation of plus or minus 2 microns and the second object optical path length differs from the first object optical path length by less than two microns.

Another version of the invention as an exchangeable lens module system for an optical probe of an interferometric measuring machine includes at least two lens modules. Each of the two lens modules has (a) a lens module housing having proximal and distal ends, (b) an objective lens mounted within the lens module housing for focusing a collimated object beam to a focal point located beyond the distal end of the lens module housing, (c) a kinematic coupling member at the proximal end of the lens module housing for connecting the lens module housing to a mating kinematic coupling member of the interferometric measuring machine. Each of the objective lenses includes a front surface facing their respective focal points. Each of the two lens modules includes a front optical path length extending from the front surface of their objective lens to their focal point and a back optical path length along the collimated object beam from the kinematic coupling member at the proximal end of their lens module housing to the front surface of their objective lens. The objective lenses of the two lens modules have different front optical path lengths for supporting different working distances between their lens module housings and their focal points. The different back optical path lengths compensate for the different front optical path lengths so that the combined front and back optical path lengths remain approximately equal to each other.

For example, to an extent that the front optical path length of a first of the two lens modules is longer than the front optical path length of a second of the two lens modules, the back optical path length of the first lens module is shorter than the back optical path length of the second lens module so that the combined front and back optical path lengths of the first and second lens modules remain more nearly equal.

Yet another version of the invention features an exchangeable lens module system for an optical probe of an interferometric measuring machine arranged for taking measurements to within a given tolerance. A probe body of the interferometric measuring machine includes a kinematic coupling member and at least two lens modules are provided, each of which includes a kinematic coupling member that is engageable with the kinematic coupling member of the probe body for connecting the lens module to the probe body. A beamsplitter within the probe body divides a source beam into a reference beam that propagates along a reference arm of the probe body to a reflector and an object beam that propagates along an object arm of the probe body that extends through one or the other of the lens modules when connected to the probe body. Each of the two lens modules also includes an objective lens mounted within the lens module for focusing the object beam to a focal point located beyond lens module. The focal lengths of the objective lenses of the two lens modules differ by more than the given tolerance. The reference arm defines an optical path length from the beam splitter to the reflector and the object arm defines an optical path length from the beamsplitter to the focal point, and the optical path length of the object arm is offset with respect to the optical path length of the reference arm. The two lens modules are exchangeable while maintaining the offset between the optical path lengths of the object and reference arms within the given tolerance.

The exchangeable lens module system further preferably includes a single mode fiber optically coupled within the probe body and a collimator mounted within the probe body for collimating a source beam emitted from the single mode fiber. The beamsplitter is preferably arranged for dividing the collimated source beam into both (a) the object beam that is directed along the object arm through the engaged kinematic coupling members for propagation through the lens module to the focal point on a test object and (b) the reference beam that is directed along the reference arm to the reflector. The beamsplitter is preferably further arranged for combining the object beam reflected from the test object with the reference beam reflected from the reference reflector into a measurement beam. The collimator is preferably arranged for focusing the measurement beam into the single mode fiber for propagation toward a detector of the interferometric measuring machine.

The source beam is preferably of a type that includes a range of beam frequencies. The detector preferably detects changes in interference phase over the range of beam frequencies. A processor preferably equates modulation frequencies relating to rates of change in interference phase over the range of beam frequencies to measures of distance.

Each of the two lens modules preferably includes a front optical path length extending from a front surface of their objective lens to their focal point and a back optical path length from their kinematic coupling member to the front surface of their objective lens. The two lens modules preferably have different front optical path lengths. The back optical path lengths of the two lens modules preferably differ by an amount that compensates for the different front optical path lengths of the two lens modules so that the combined front and back optical path lengths of the two lens modules having different front optical path lengths remain more nearly equal to within the given tolerance.

BRIEF DESCRIPTION OF DRAWING FIGURES

FIGS. 3A and 3B graphically depict two different measurement outputs of the interferometer in which intensity varies as a function of wavenumber at different modulation frequencies associated with different optical path lengths of the object and reference beams.

FIG. 4 graphically depicts a calculated output of a processor for identifying a modulation frequency based on the output of the detector.

Figure 5:
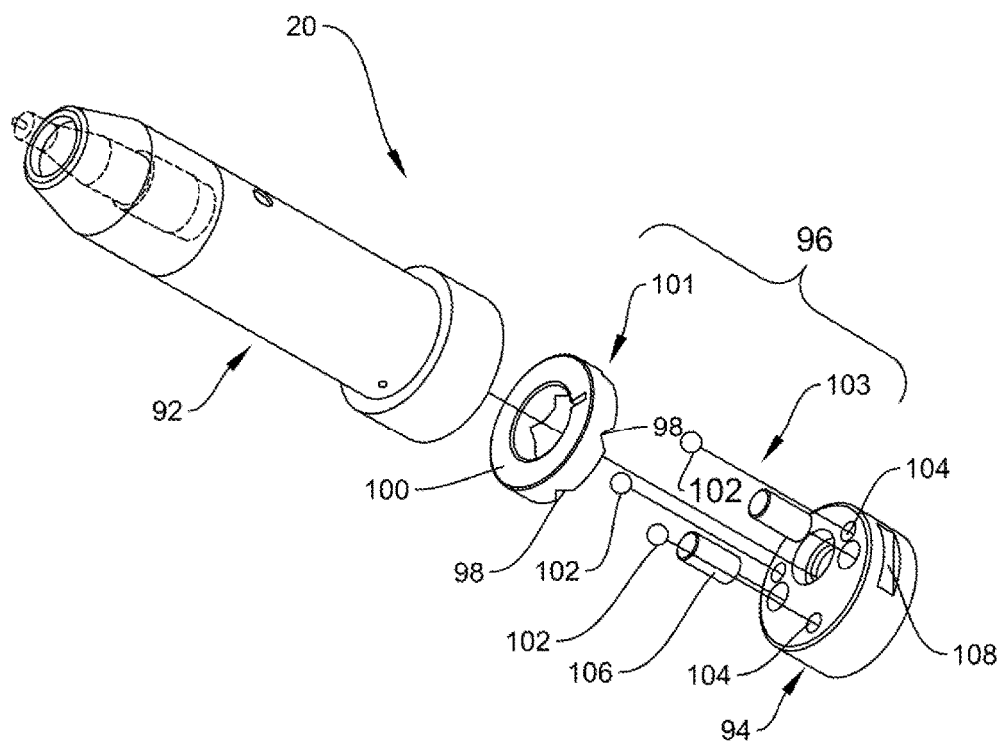

FIG. 5 is an exploded perspective view of a probe featuring a kinematic coupling member for joining a lens module to a probe body.

Figure 6:
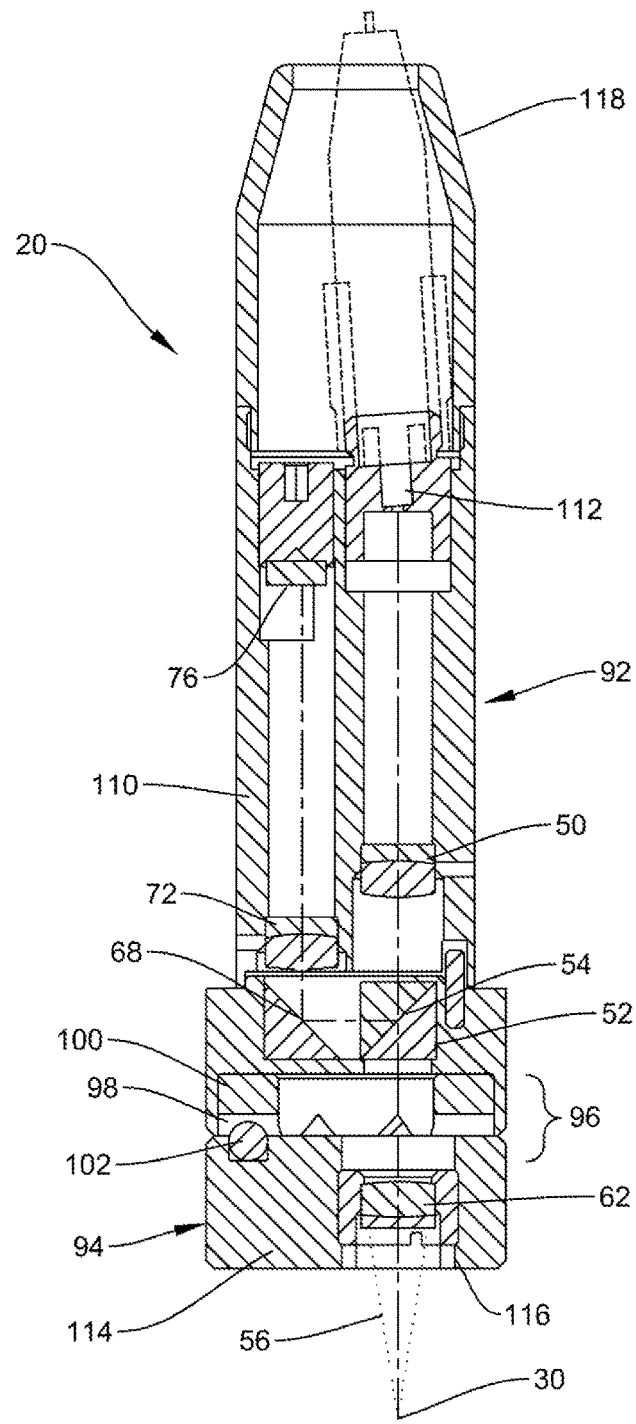

FIG. 6 is a side elevational view of the probe taken in cross section for showing internal structural details including optical components of an interferometer.

Figures 7A, 7B:
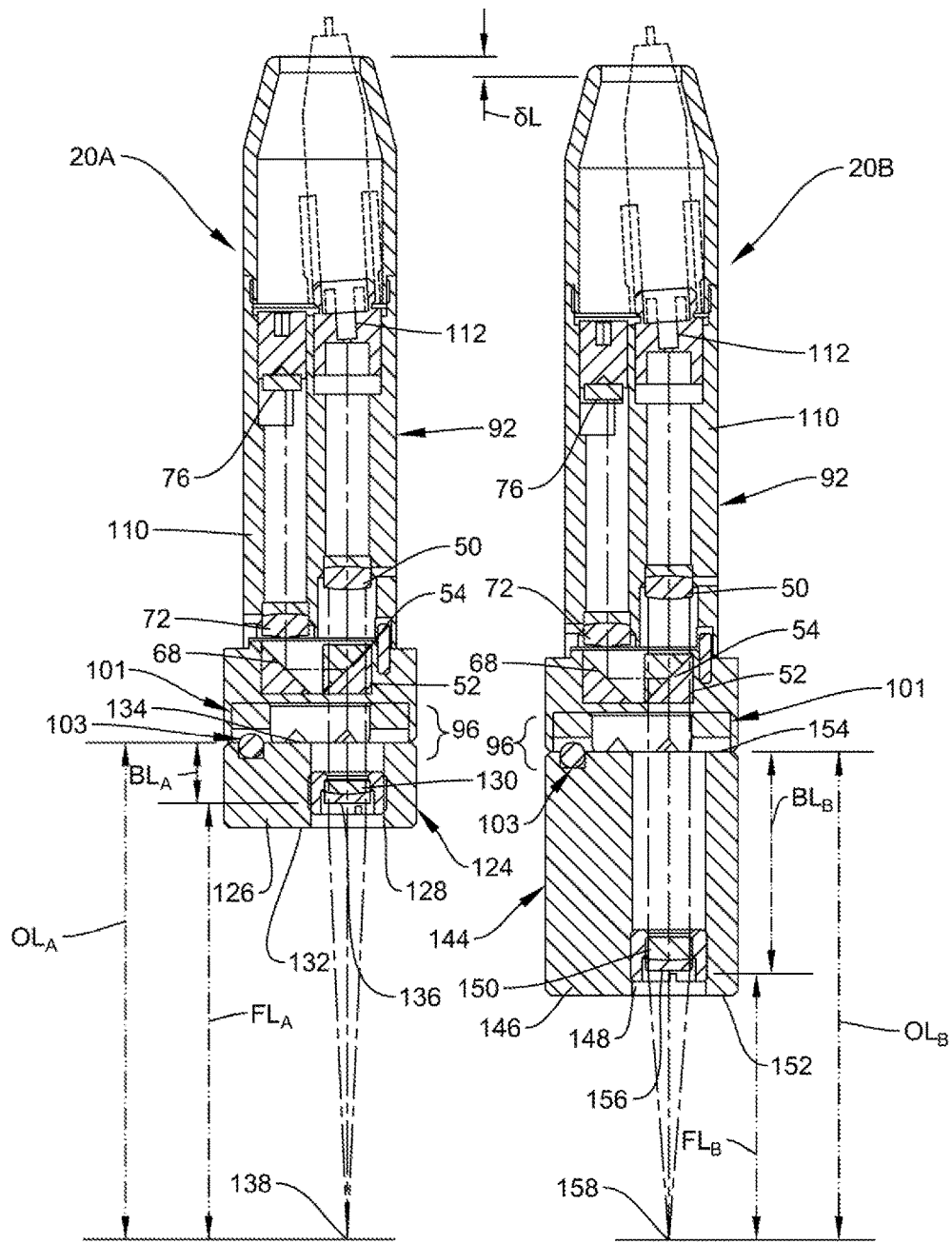

FIGS. 7A and 7B are similar side elevational views in cross section comparing two probes that are distinguished by a common probe body in engagement with two different but interchangeable lens modules arranged to exhibit equal optical path lengths.

Figures 8A, 8B:
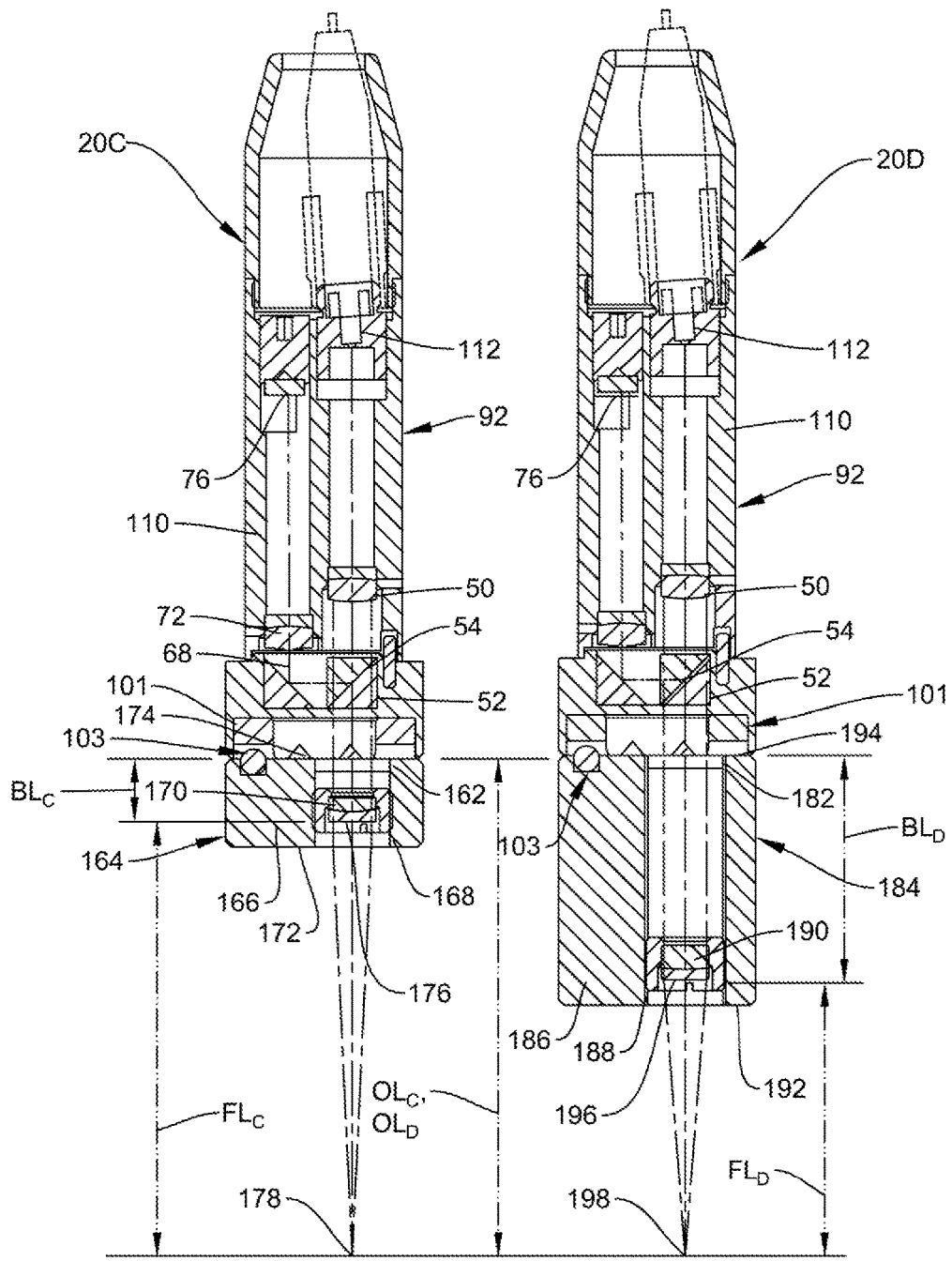

FIGS. 8A and 8B are similar side elevational views in cross section comparing two other probes that are distinguished by a common probe body in engagement with two different but interchangeable lens modules arranged to exhibit both equal optical path lengths and physical path lengths.

Figure 9:
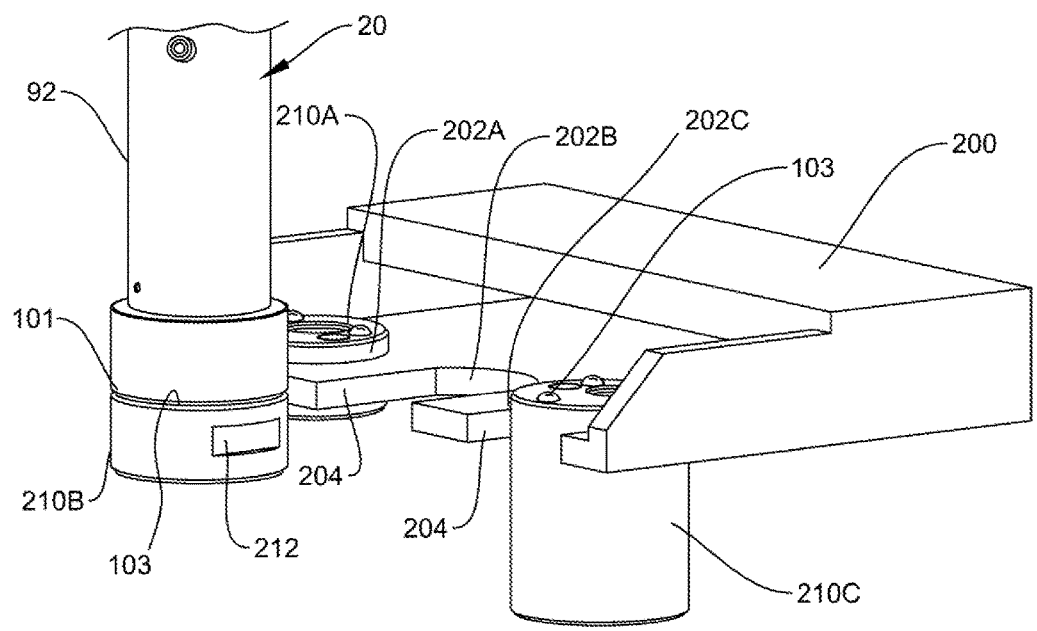

FIG. 9 is a perspective view of a docking station at which different lens modules are stored and exchanged with a lens module engaged with the probe body.

DETAILED DESCRIPTION

Figure 1:
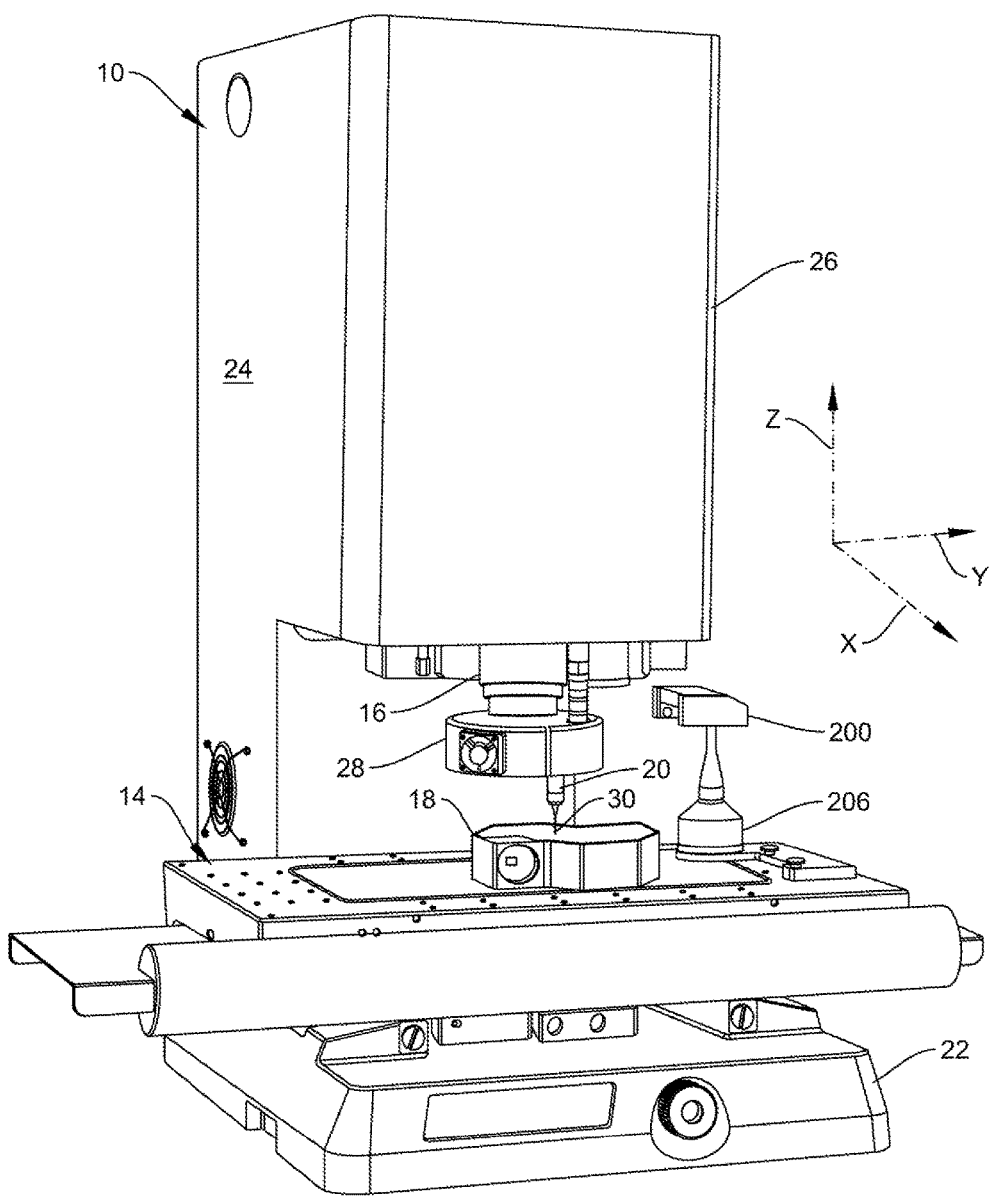
FIG. 1 is a front and left side perspective view of a multi-axis measuring machine in accordance with an embodiment of this invention.

A multi-axis machine 10 depicted in FIG. 1 is one of many possible configurations of an optical measuring machine. An x-y stage 14 horizontally translates a test object 18 along X and Y coordinate axes, and a slide mechanism 16 vertically translates an interferometer probe 20 along a Z coordinate axis. The x-y stage 14 is supported on a machine base 22. The slide mechanism 16 is supported under enclosure 26 carried on a column 24. In addition to mounting the interferometer probe 20 for translation along the Z coordinate axis, the interferometer probe 20 can also be carried on an articulated arm (not shown) that is both pivotal about a horizontal axis and rotatable together with the pivot axis about the Z coordinate axis. A ring-shaped light source 28 is shown for use with vision systems that can also be incorporated into the multi-axis machine 10. Other apparatus supporting the metrology functions of the machine 10 can be housed in the slide mechanism 16 or behind the enclosure 26 within which the slide mechanism is translatable. Relative motions between the interferometer probe 20 and the test object 18 are measured along or about the various motion axes to monitor the relative position of the interferometer probe 20 with respect to the test object 18 within a common coordinate system. Besides the interferometric probe 20, the multi-axis machine 10 can also include vision systems and other probes or sensors mounted to the Z coordinate axis.

The measuring machine 10 can be arranged with other combinations of rotational and translational axes for relatively moving one or the other of the test object 18 and the interferometer probe 20. Preferably, for gathering information about the test object 18, such as empirical descriptions of test object profiles, the relative motions provide for maintaining an optical focus 30 of light emitted through optical elements of the probe 20 proximate to the test object 18 over a range of different positions on the test object 18 at orientations effective for collecting specular or diffuse reflections of the light from the test object 18 through at least some of the same optical elements of the probe 20.

Figure 2:
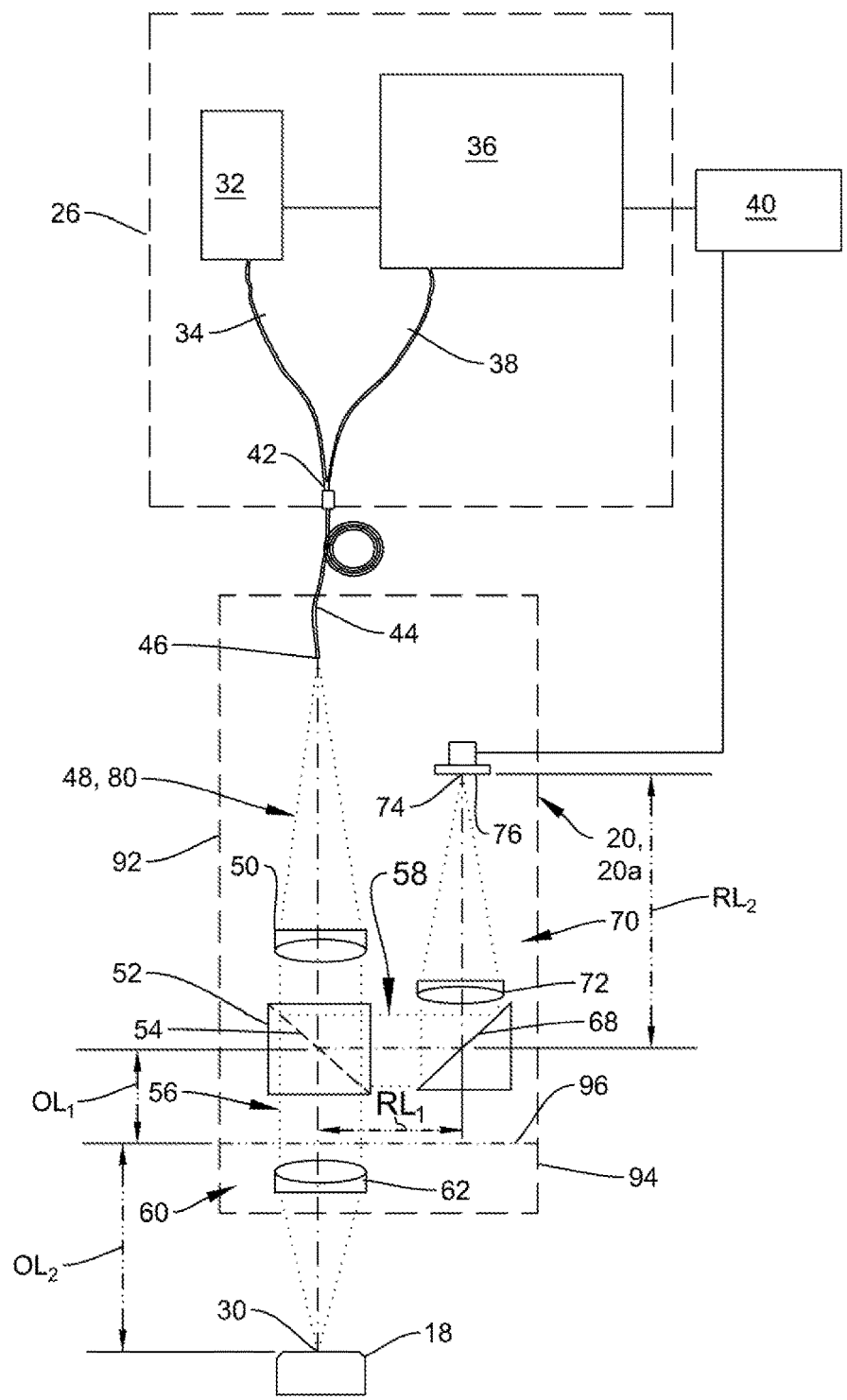
FIG. 2 is a diagram of an optical measurement system for the measuring machine of FIG. 1 in which object and reference arms of an interferometer are mounted in a probe and connected to both a light source and a detector by a single mode fiber.

An optical arrangement for taking measurements of the test object 18 with an optical measurement system for the measuring machine 10 is shown in FIG. 2. A light source 32, such as a superluminescent diode, provides for delivering high spatially coherent but low temporally coherent (i.e., light containing a range of wavelengths over a continuum of wavelengths) to the interferometer probe 20 through a single mode fiber 34. Preferably within the same enclosure 26, a detector 36 is arranged for receiving the light returning from the interferometer probe 20 though a single mode fiber 38. A processor 40 for processing information from the detector 36 is preferably located outside the enclosure for communicating with a user interface (not shown).

A fiber coupler 42, which can be a 50%/50% coupler, connects the single mode fibers 34 and 38 to a common single mode fiber 44 for transmitting the high spatially coherent, low temporally coherent light to and from the interferometer probe 20. As schematically shown, the single mode fiber 44 has extra length to accommodate some motions of the interferometer probe 20 with respect to the slide support 26.

Within the interferometer probe 20 having a probe housing 20a schematically coincident with the representative dashed outline of the interferometer probe 20, the light is directed to a Linnik-type interferometer, although other interferometric arrangements could be used. In the arrangement shown, the light emitted from an end 46 of the single mode fiber 44 as a source beam 48 (shown in dotted lines) is gathered and collimated by a collimator/condenser lens 50 in optical alignment with a beamsplitter 52. At a partially reflective surface 54 of the beamsplitter 52, the source beam 48 is divided into an object beam 56 (shown in dotted lines)

that transmits through the partially reflective surface 54 and a reference beam 58 (shown in dotted lines) that is reflected by the partially reflective surface 54. The object beam 56 propagates along an object arm 60 through an object objective lens 62 within the probe housing 20a to the optical focus 30 proximate the test object 18 beyond the probe housing 20a. The reference beam 58 reflects from a turning mirror 68 and further propagates along a reference arm 70 through a reference objective lens 72 within the probe housing 20a to a reference focus 74 proximate a reference reflector 76, which can be in the form of a plane mirror also within the probe housing 20a. Preferably, all three lenses 50, 62, and 72 are achromatic, low dispersion lenses for matching focusing effects of the different wavelengths within the source, object, and reference beams 48, 56, and 58.

Specular or diffuse reflections of the object beam 56 from the test object 18 are collected and re-collimated by the object objective lens 62 on route back to the beamsplitter 52. Similarly, reflections from the reference reflector 76 are collected and re-collimated by the reference objective lens 72 on route back to the beamsplitter 52. At the beamsplitter 52, at least a portion of the returning object beam 56 that transmits through the partially reflective surface 54 is recombined with at least a portion of the returning reference beam 58 that reflects from the partially reflective surface 54 into a common measurement beam 80 (shown overlaid with the source beam 48) on a return path to the collimator/condenser lens 50. Since the reflectivity of the test object 18 is generally less than the reflectivity of the reference reflector 76, the beamsplitter 52 is preferably arranged to more efficiently transmit light through the partially reflective surface 54 and to less efficiently reflect light from the partially reflective surface 54. The collimator/condenser lens 50 focuses the measurement beam 80 containing portions of the object and reference beams 56 and 58 back into the single mode fiber 44 for transit to the detector 36. The end 46 of the single mode fiber 44 receives the measurement beam 80 through the volume of an acceptance cone, which is related generally to the refractive indices of the fiber core and cladding.

Within the detector 36 arranged as a spectrometer, the measurement beam 80 can be re-collimated and reflected off a diffraction grating (not shown) over a range of spectrally dispersed orientations, and the dispersed orientations of the measurement beam 80 can be focused along a linear array of photodiodes or charge-coupled devices (CCDs) (also not shown). Each different frequency (as a reciprocal of wavelength) from the object beam 56 portion of the measurement beam 80 interferes with the corresponding frequency of the reference beam 58 portion of the measurement beam 80 at a different focus position along the array. The intensity of the light focused along the array, representative of modulo $2\pi$ phase differences between the object and reference beam 56, 58 portions of the measurement beam 80, modulates at a detectable frequency, referred to as a modulation frequency that varies within a Nyquist interval (due to pixel sampling) proportional to the optical path length difference between the object and reference beam 56, 58 portions of the measurement beam 80. Since the intensity information is collected by a discrete number of pixels, the distinguishable frequencies generally range from zero up to one-half of the number of pixels involved in the measurement.

FIGS. 3A and 3B graph two different examples of intensity variations captured along the linear array pixels and along which the focus positions of the different frequencies (wavenumbers) are dispersed. The variation in intensity corresponding to variations in interference phase is nearly periodic at a measurable frequency, referred to as the modulation frequency. As optical path length differences between the object and reference beam 56, 58 portions of the measurement beam 80 increase from zero (i.e., the null position), the modulation frequency increases proportionally within the Nyquist interval of measurement. For example, the frequency of modulation depicted in FIG. 3A appears higher than the frequency of modulation depicted in FIG. 3B, evidencing a greater optical path length difference between the object and reference beam 56, 58 portions of the measurement beam 80 in the measurement captured by the detector 36 as shown in FIG. 3A versus the measurement of optical path length difference captured by the detector 36 as shown in FIG. 3B. FIG. 4 shows a calculated modulation frequency as a frequency spike 86 within the depicted range of measurement as may be graphically output from the processor 40.

Within the processor 40, the calculated modulation frequency can also be converted into a height on the surface of the test object 18. For gathering data over a range of points on the test object 18 within a common coordinate system, relative motions between the probe 20 and the test object 18 are monitored for tracing a position of the focus 64 of the probe 20 in space. During setup, the optical path length difference between the object and reference beams 56, 58 considered at the ideal focus position is preferably set at a given modulation frequency. During measurement, departures from the given modulation frequency interpreted as surface height variations can be added to or subtracted from the measured relative position of the probe focus 64 to provide a finer measure of the position of a measured point on the test object 18 within the depth of focus of the objective lens 62.

Since departures from the given modulation frequency are also measures of departures from the ideal focus position, the departures from the given modulation frequency can also be used to maintain the focus within a usable range. In other words, the relative position of the probe 20 can be corrected by displacing the probe 20 along the Z axis to position the ideal focal point closer to the surface of the test object 18 and at a modulation frequency closer to the given modulation frequency. The focus corrections, in turn, maintain the probe within the intended Nyquist interval of measurement.

With reference first to FIG. 2, the probe 20 is divided into two parts, a probe body 92 and an interchangeable lens module 94 joined together by a kinematic coupling 96. The object beam 56 propagates from the partially reflective surface 54 of the beamsplitter 52 to the kinematic coupling 96 traversing a first object optical path length $OL_1$ and continues propagating along the object arm 60 from the kinematic coupling 96 to the optical focus 30 traversing a second object optical path length $OL_2$. The reference beam 58 propagates from the partially reflective surface 54 of the beamsplitter 52 to the turning mirror 68 traversing a first reference optical path length $RL_1$ and continues propagating along the reference arm 70 from the turning mirror 68 to the reference focus 74 traversing a second reference optical path length $RL_2$. The various optical path lengths $OL_1$, $OL_2$, $RL_1$, and $RL_2$ are depicted in phantom dimension lines to indicate that distances being referenced are not true physical distances but a product of the physical distances and the average refractive indices of the mediums through which the beams pass (i.e., the various optical path lengths are the sums of the products of their physical length segments times the refractive index of each segment). The total optical path length of the object arm 60, which is a combination of the first and second object optical path lengths $OL_1$ and $OL_2$, differs from the total optical path length of the reference arm 70, which is a combination of the first and second reference optical path lengths $RL_1$ and $RL_2$, by a given amount $\Delta L$, which corresponds to the desired modulation frequency within the intended Nyquist interval of measurement. Any change to the lens module 94 preferably does not change the second object optical path length $OL_2$ so that the given optical path length difference $\Delta L$ setting the desired modulation frequency is not disturbed.

FIG. 5 shows an exploded view of the probe 20, which is divided into a probe body 92 and a lens module 94. A kinematic coupling 96 (similar to that disclosed in U.S. Pat. No. 9,009,985 B2, which is hereby incorporated for reference) connects the lens module 94 to the probe body 92 but is releasable for connecting other lens modules (not shown) to the probe body 92 in an interchangeable fashion. The kinematic coupling includes a first member 101 comprising a first set of engagement elements 98 in the form of equiangularly spaced V-shaped grooves in an annular plate 100 carried by the probe body 92 and a second mating member 103 comprising a second set of engagement elements 102 in the form of balls that are captured within recesses 104 in the lens module 94. The balls 102 are biased into contact with the V-shaped grooves 98 for repeatably locating the lens module 94 with respect to the probe body 92 by magnetic pins 106 that releasably hold the lens module 94 and the probe body 92 together. Slots 108 formed in opposite sides of the lens module 94 can be easily gripped in an automated or manual fashion for separating the lens module 94 from the probe body 92.

The probe 20 is shown in FIG. 6 in a cross-sectional view. The probe body 92 includes a multi-part housing 110 to aid in the assembly of the various elements of the interferometer, which begins with an optical mounting 112 for the single mode fiber 44. Many of the remaining elements of the interferometer laid out in FIG. 2 are identified by corresponding reference numbers in their mounted positions within the multi-part housing 110. The lens module 94, which includes a housing 114 with a through aperture 116 for mounting the objective lens 62, is shown releasably connected to the probe body 92 through the kinematic coupling 96. The object beam 56 propagates through the aperture 116 to the optical focus 30. The upper end of the multi-part housing 110 of the probe body 92 includes a truncated conical end 118 for covering the fiber connector.

The probe body 92 appears in both FIGS. 7A and 7B, but the probe body 92 is coupled to two different lens modules 124 and 144 to assemble two different probes 20A and 20B. Both lens modules 124 and 144 contribute to forming the same kinematic coupling 96 with the probe body 92 and are similarly physically interchangeable with for coupling to the probe body 92.

The lens module 124 includes a housing 126 having a through aperture 128 for mounting an objective lens 130. Similarly, the lens module 144 includes a housing 146 having a through aperture 148 for mounting an objective lens 150. In contrast, however, the objective lens 130 has a front optical path length $FL_A$, also referred to as a front focal length of the objective lens 130, measured from a front surface 136 of the objective lens 130 to its optical focus 138 that is significantly longer than a front optical path length $FL_B$, also referred to as a front focal length of the objective lens 150, which is measured from a front surface 156 of the objective lens 150 to its optical focus 158. The different front optical path lengths $FL_A$ and $FL_B$ define the probes 20A and 20B with both different working distances for establishing clearance with a test object and different numerical apertures, which affect both depth of focus and resolution.

The housing 126 of the lens module 124 has a distal end 132 facing the optical focus 138 and a proximal end 134 facing the probe body 92. The aperture 128 extends through the distal and proximal ends 132 and 134 of the housing 124 to provide an optical pathway for the object beam through the housing 126. Similarly, the housing 146 of the lens module 144 has a distal end 152 facing the optical focus 158 and a proximal end 154 facing the probe body 92, and the aperture 148 extends through the distal and proximal ends 152 and 154 of the housing 146 to provide an optical pathway for the object beam 56 through the housing 146. The lens modules 124 and 144 include a similar kinematic coupling member 103 at the proximal ends 134, 154 of their respective housings 126, 146 that aligns and connects one or the other of the lens modules 124, 144 to the mating kinematic coupling member 101 of the probe body 92.

In addition to having respective objective lenses 130 and 150 that exhibit different front optical path lengths $FL_A$ and $FL_B$, the lens modules 124 and 144 also define different back optical path lengths $BL_A$ and $BL_B$. The various optical path lengths $FL_A$, $FL_B$, $BL_A$, and $BL_B$ are depicted in phantom dimension lines to indicate that distances being referenced are not true physical distances but a product of the physical distances and the average refractive indices of the mediums through which the beams pass (i.e., the various optical path lengths are the sums of the products of their physical length segments times the refractive index of each segment). The back optical path length $BL_A$ extends from the front surface 136 of the objective lens 130 through the aperture 128 to the kinematic coupling member 103 at the proximal end 134 of the housing 126. The back optical path length $BL_B$ extends from the front surface 156 of the objective lens 150 through the aperture 148 to the kinematic coupling member 103 at the proximal end 154 of the housing 144. The different back optical path lengths $BL_A$ and $BL_B$ compensate for the different front optical path lengths $FL_A$ and $FL_B$ so that the combined front and back optical path lengths $OL_A$ and $OL_B$ (i.e., $OL_A = FL_A + BL_A$ and $OL_B = FL_B + BL_B$) remain approximately equal to each other and to the above-referenced second object optical path length $OL_2$ (see FIG. 2) to preserve the desired modulation frequency within the measurement interval. For example, to the extent that the front optical path length $FL_A$ of the lens module 124 is longer than the front optical path length $FL_B$ of the lens module 144, the back optical path length $BL_A$ of the lens module 124 is shorter than the back optical path length $BL_B$ of the lens module 144 so that the combined front and back optical path lengths of the first and second lens modules $OL_A$ and $OL_B$ remain more nearly equal for preserving the desired optical path length difference $\Delta L$ between the object beam 56 and the reference beam 58. As shown, the back optical path lengths $BL_A$ and $BL_B$ are mainly adjusted by varying the spacing between the objective lenses 130 and 150 and their respective kinematic coupling members 103 at the proximal ends 134 and 154 of their respective lens module housings 126 and 146. However, this spacing must also account for different thicknesses or refractive indicies of the objective lenses 130 and 150, which also affect the back optical path lengths $BL_A$ and $BL_B$.

Similar to the optical path lengths $FL_A$, $FL_B$, $BL_A$, and $BL_B$ the combined optical path lengths $OL_A$, and $OL_B$ are depicted in phantom lines as an indication that the refractive indices of the mediums through which the object beam 56 travels through the lens modules 124 and 144 to the respective focal points 138 and 158 must also be considered in arriving at the referenced measures of optical path length. Propagations through glass can result in significant differences between physical and optical path lengths. For example, if the objective lens 150 were made significantly thicker than the objective lens 130 to achieve the desired increase in numerical aperture (i.e., a shorter front focal length), then the physical length of the optical dimension $OL_B$ must be significantly shorter than the physical length of the optical dimension $OL_A$ so that the combined optical path lengths $OL_A$ and $OL_B$ remain nearly equal. To emphasize this point, the physical dimension associated with the optical path length $OL_A$ is depicted slightly longer than the physical dimension associated with the optical path length $OL_B$ despite the fact that the two optical path lengths $OL_A$ and $OL_B$ are intended to be equal. The different physical lengths considered are evident by the measure δL comparing offsets of the two probes 20A and 20B. The relative positions of the focal points 138 and 158 with respect to the coordinate axes of the measuring machine 10 are preferably recalibrated to account for the offset δL in subsequent measurements.

The individual measurements taken by the measuring machine 10 are captured within a known tolerance, which accounts for various systematic and random errors associated with the measurements. Preferably, the optical path lengths $OL_A$ and $OL_B$ do not differ from each other or the intended second object optical path length $OL_2$ by more than the known tolerance to maintain the desired modulation frequency at the optical focus 30, 138. 158. For example, the tolerance of the measurements of a typical measuring machine arranged with a partially coherent interferometer for taking point-by-point measurements can be set at plus or minus 2 microns and the optical path lengths $OL_A$ and $OL_B$ do not differ from each other or the intended second object optical path length $OL_2$ by more than this 2 micron tolerance.

FIGS. 8A and 8B depict a further modified exchangeable lens module system in which the same probe body 92 is coupled to two different lens modules 164 and 184 to assemble two different probes 20C and 20D. In contrast to the immediately preceding embodiment, the lens modules exhibit not only equal optical path length $OL_C$ and $OL_D$ but also equal physical path lengths resulting in a zero offset δL.

The lens module 164 includes a housing 166 having a through aperture 168 for mounting an objective lens 170. Similarly, the lens module 184 includes a housing 186 having a through aperture 188 for mounting an objective lens 190. In contrast, however, the objective lens 170 has a front optical path length $FL_C$, also referred to as a front focal length of the objective lens 170, measured from a front surface 176 of the objective lens 170 to its optical focus 178 that is significantly longer than a front optical path length $FL_D$, also referred to as a front focal length of the objective lens 190, which is measured from a front surface 196 of the objective lens 190 to its optical focus 198. The different front optical path lengths $FL_C$ and $FL_D$ define the probes 20C and 20D with both different working distances for establishing clearance with a test object and different numerical apertures, which affect both depth of focus and resolution.

The housing 166 of the lens module 164 has a distal end 172 facing the optical focus 178 and a proximal end 174 facing the probe body 92. The aperture 168 extends through the distal and proximal ends 172 and 174 of the housing 164 to provide an optical pathway for the object beam through the housing 166. Similarly, the housing 186 of the lens module 184 has a distal end 192 facing the optical focus 198 and a proximal end 194 facing the probe body 92, and the aperture 188 extends through the distal and proximal ends 192 and 194 of the housing 186 to provide an optical pathway for the object beam 56 through the housing 186. The lens modules 164 and 184 include a similar kinematic coupling member 103 at the proximal ends 174, 194 of their respective housings 166, 186 that aligns and connects one or the other of the lens modules 164, 184 to the mating kinematic coupling member 101 of the probe body 92.

In addition to having respective objective lenses 170 and 190 that exhibit different front optical path lengths $FL_C$ and $FL_D$, the lens modules 164 and 184 also define different back optical path lengths $BL_C$ and $BL_D$. The various optical path lengths $FL_C$, $FL_D$, $BL_C$, and $BL_D$ are also depicted in phantom dimension lines to indicate that distances being referenced are not true physical distances but a product of the physical distances and the average refractive indices of the mediums through which the beams pass (i.e., the various optical path lengths are the sums of the products of their physical length segments times the refractive index of each segment). The back optical path length $BL_C$ extends from the front surface 176 of the objective lens 170 through the aperture 168 to the kinematic coupling member 103 at the proximal end 174 of the housing 166. The back optical path length $BL_D$ extends from the front surface 196 of the objective lens 190 through the aperture 188 to the kinematic coupling member 103 at the proximal end 194 of the housing 184. The different back optical path lengths $BL_C$ and $BL_D$ compensate for the different front optical path lengths $FL_C$ and $FL_D$ so that the combined front and back optical path lengths $OL_C$ and $OL_D$ (i.e., $OL_C=FL_C+BL_C$ and $OL_D=FL_D+BL_D$) remain approximately equal to each other and to the above-referenced second object optical path length $OL_2$ (see FIG. 2) to preserve the desired modulation frequency within the measurement interval. For example, to the extent that the front optical path length $FL_C$ of the lens module 164 is longer than the front optical path length $FL_D$ of the lens module 184, the back optical path length $BL_C$ of the lens module 164 is shorter than the back optical path length $BL_D$ of the lens module 184 so that the combined front and back optical path lengths of the first and second lens modules $OL_C$ and $OL_D$ remain more nearly equal for preserving the desired optical path length difference ΔL between the object beam 56 and the reference beam 58.

In contrast to the lens modules 124 and 144 of FIGS. 7A and 7B, each of the lens modules 164 and 184 is fitted with a window 162 or 182 along their respective apertures 168 and 188. Shown at the proximal ends 174 and 194 of the respective lens modules 164 and 184, the windows 162 and 182 are preferably plate shaped for propagating the collimated object beam 56 with little or no refraction. However, to the extent that the objective lenses 170 and 190 would otherwise contribute to altering the average refractive indices used in the calculation of the optical path lengths $OL_C$ and $OL_D$, the windows 162 and 182 are relatively adjusted in thickness or refractive index so that the average refractive indices used in the calculation of the optical path lengths $OL_C$ and $OL_D$ remain substantially the same.

Assuming, for instance, that the lenses 170 and 190 are made of the same optical material (i.e., have equal refractive indices) but the lens 190 is substantially thicker than the lens 170 to accommodate a higher desired numerical aperture, the windows 162 and 180, if also made of the same optical material as the lenses 170 and 190 would preferably differ in thickness by the substantially the same amount so that the thickness of the window 162 combined with the thickness of the lens 170 would substantially equal the thickness of the window 182 combined with the thickness of the lens 190. Thus, the window 162 would be thicker than the window 182 by substantially the same amount that the lens 190 is thicker than the lens 170. Referring to the common material as glass, both lens modules 164 and 184 would have substantially the same thickness of glass along their respective apertures 168 and 188. The remainder of the optical pathways from kinematic couplings at the proximal ends 174 and 194 of the lens modules 164 and 184 to their respective focal point 178 and 198 contain substantially the same thickness of air. While more complicated situations can arise, the pathways having substantially equal optical path lengths $OL_C$ and $OL_D$ can be arranged to also have equal physical path lengths by balancing the average refractive indices of the pathways.

While the windows 162 and 182 are shown mounted along the apertures 168 and 188 at the proximal ends 174 and 194 of the lens modules 164 and 184, the windows 162 and 182 could be positioned anywhere along the apertures 168 and 188 from the proximal ends 174 and 194 to the lenses 170 and 190 for conveying the object beam 56 in a collimated form without undesired refractive effects. To limit reflectivity, the refractive index of the windows 162 and 182 can be reduced. Alternatively, the pathways having equal optical path lengths $OL_C$ and $OL_D$ can be arranged with equal physical path lengths without appending any optics (including windows) by designing the lenses 170 and 190 to contribute equal optical path lengths at different optical powers. By maintaining the optical and physical path lengths through the lens module to the focal point, the lens modules with different focal lengths can be exchanged while maintaining the same modulation frequency at the focal point and the same relative position of the focal point with respect to the other measurement axes of the measuring machine.

As shown in FIG. 9, the probe 20, although truncated and shown in isolation, is relatively movable with respect to a docking station 200 via the regular (e.g., X, Y, and Z) machine axes. As shown in a more realistic setting, the docking station 200 is also shown in FIG. 1 supported on a tapered pedestal 206 that is carried on the x-y stage 14. The probe 20 includes a probe body 92 and a lens module 210B that is coupled to the probe body 92. The docking station 200 includes three U-shaped holders 202A, 202B, and 202C having side walls 204 that are dimensioned to receive slots 212 formed in opposite sides of lens modules housings. Lens modules 210A and 210C are shown already supported in the docking station 200. The probe 20 is shown in alignment with the holder 202B for depositing the lens module 210B in the holder 202B.

Via its connection to the measuring machine 10, the probe body 92 is relatively movable with respect to the docking station 200 for aligning the lens module with 210B with any one of the lens module holders 202A. 202B or 202C. FIG. 9 shows by way of example the probe body 92 together with its attached lens module 210B in alignment with the holder 202B. When the probe body 92 is relatively translated in a horizontal direction toward the holder 202B, which can be accomplished by moving the docking station 200 on the x-y stage 14, the side walls 204 of the holder 202B engage the opposite side slots 212 of the lens module 210B to provide independent support for the lens module 210B in the docking station 200. Further relative translation of the probe body 92 in a vertical direction, which can be accomplished by moving the probe body 92 together with the slide mechanism 16, has the effect of disengaging the kinematic coupling member 103 at the proximal end of the lens module housing of the lens module 210B with the mating kinematic coupling member 101 of the probe body 92 and withdrawing the probe body 92 leaving behind the lens module 210B in the holder 202B. Details of the kinematic coupling members 101 and 103 for effecting the disengagement are apparent in reference to FIGS. 5, 6, 7A, and 7B.

For exchanging the lens module 210B with another of the lens modules 210A or 210C in the docking station 200, the probe body 92 is relatively translatable in an orthogonal horizontal direction for aligning the mating kinematic coupling member 101 of the probe body 92 with the kinematic coupling member 103 at the proximal end of the lens module housing of either of the two other lens modules 210A or 210C. A further relative vertical translation of the probe body 92 provides for engaging the kinematic coupling member 103 at the proximal end of the lens module housing of one of the lens modules 210A or 210C with the mating kinematic coupling member 101 of the probe body 92, and a further relative translation of the probe body 92 in a horizontal direction provides for withdrawing the engaged lens module 210A or 210C from the docking station 200. The probe body 92 together with the engaged lens module 210A or 210C reconstitutes the probe 20 for measuring a test object 18 on the measuring machine 10. By maintaining the optical path length $OL_2$ as measured from the kinematic coupling 103 to the point focus 30, 138, 158 constant between exchanges among the probe modules 210A, 210B, and 210C, the desired modulation frequency at which the measurements are taken by the measuring machine 10 is preserved.

Those of skill in the art will appreciate that the invention as set forth in the claims can be embodied in a variety of configurations and related steps embracing the relationships and other teachings of the invention.

The invention claimed is:

1. An exchangeable lens module system for an optical probe of an interferometric measuring machine having a reference arm and an object arm and arranged for measuring surface height measurements of test objects having an accuracy of the height measurements within a given tolerance, comprising:
    a plurality of lens modules, each being arranged for being located along the object arm of the optical probe;
    each of the lens modules including (a) a lens module housing having proximal and distal ends, (b) an objective lens mounted within the lens module housing for focusing a collimated object beam to a focal point located beyond the distal end of the lens module housing, (c) a kinematic coupling member at the distal proximal end of the lens module housing for connecting the lens module housing to a mating kinematic coupling member of the interferometric measuring machine through which the collimated object beam enters the respective lens modules, and (d) an optical path length between each of the focal points and the respective kinematic coupling members at the proximal ends of each of the lens module housings;
    the objective lenses of two or more of the lens modules having different focal lengths that differ by more than the given tolerance;
    each of the objective lenses of the two or more of the lens modules being spaced apart from their respective kinematic coupling members at the proximal ends of their respective lens module housings through a distance that equalizes the optical path lengths between each of the focal points and the respective kinematic coupling members of the two or more lens modules to within the given tolerance; and optical paths between each of the focal points and the respective kinematic coupling members of the two or more lens modules exhibit equal average refractive indices so that physical path lengths between each of the focal points and the respective kinematic coupling members of the two or more lens modules remain equal to within the given tolerance.

2. The exchangeable lens module system of claim 1 in which the given tolerance encompasses a range of variation of plus or minus 2 microns and the optical path lengths of the two or more lens modules are within 2 microns.

3. The exchangeable lens module system of claim 1 further comprising a probe body of the interferometric measuring machine supporting the mating kinematic coupling member, a single mode fiber optically coupled within the probe body, and a collimator mounted within the probe body for collimating a source beam emitted from the single mode fiber.

4. The exchangeable lens module system of claim 3 further comprising a reference reflector and a beamsplitter mounted in the probe body, the beamsplitter being arranged for dividing the collimated source beam into both the object beam that is directed along the object arm through the mating kinematic coupling member for propagation through the lens module housing to the focal point on a test object and a reference beam that is directed along the reference arm to the reference reflector.

5. The exchangeable lens module system of claim 4 in which the beamsplitter is further arranged for combining the object beam reflected from the test object with the reference beam reflected from the reference reflector into a measurement beam.

6. The exchangeable lens module system of claim 5 in which the collimator provides for focusing the measurement beam into the single mode fiber for propagation toward a detector of the interferometric measuring machine.

7. The exchangeable lens module system of claim 1 further comprising:

a probe body of the interferometric measuring machine supporting the mating kinematic coupling member and providing an optical pathway for directing the collimated object beam through the mating kinematic coupling member, a docking station for holding one or more of the lens modules, and the probe body being relatively movable with respect to the docking station for (a) aligning the mating kinematic coupling member of the probe body with the kinematic coupling member at the proximal end of the lens module housing of the one lens module, (b) engaging the kinematic coupling member at the proximal end of the lens module housing of the one lens module with the mating kinematic coupling member of the probe body, and (c) withdrawing the one lens module from the docking station.

8. The exchangeable lens module system of claim 7 in which the docking station includes a plurality of lens module holders and the probe body is further relatively movable with respect to the docking station for (d) aligning the one lens module with one of the lens module holders, (e) disengaging the kinematic coupling member at the proximal end of the lens module housing of the one lens module with the mating kinematic coupling member of the probe body, and (f) withdrawing the probe body leaving behind the one lens module in the one lens module holder.

9. The exchangeable lens module system of claim 1 in which the objective lenses of the two lens modules exhibit different optical path length thicknesses, and further comprising optics mounted along the optical paths between kinematic coupling members and the objective lenses of the two lens modules to compensate for the different optical path length thicknesses of the objective lenses and to provide for the equal average refractive indices along the optical paths between each of the focal points and the respective kinematic coupling members of the two or more lens modules.

* * * * *